(12) United States Patent
DuBois

(10) Patent No.: US 11,285,398 B2
(45) Date of Patent: Mar. 29, 2022

(54) PHOTOVOLTAIC DISTILLER FOR THE RECYCLING OF GREYWATER TO POTABLE WATER

(71) Applicant: Tod DuBois, Newport, OR (US)

(72) Inventor: Tod DuBois, Newport, OR (US)

( * ) Notice: Subject to any disclaimer, the term of this patent is extended or adjusted under 35 U.S.C. 154(b) by 0 days.

(21) Appl. No.: 16/153,665

(22) Filed: Oct. 5, 2018

(65) Prior Publication Data
US 2021/0008463 A1 Jan. 14, 2021

(51) Int. Cl.
C02F 1/14 (2006.01)
B01D 1/00 (2006.01)
B01D 5/00 (2006.01)
C02F 103/00 (2006.01)

(52) U.S. Cl.
CPC ........... B01D 1/0035 (2013.01); B01D 5/006 (2013.01); C02F 1/14 (2013.01); C02F 2103/002 (2013.01); C02F 2201/009 (2013.01)

(58) Field of Classification Search
CPC ........ C02F 1/04; C02F 1/14; C02F 2103/002; B01D 1/0035
See application file for complete search history.

(56) References Cited

U.S. PATENT DOCUMENTS

| 4,323,052 A * | 4/1982 | Stark | F24S 30/40 126/571 |
| 4,487,659 A * | 12/1984 | Stark | C02F 1/14 202/172 |
| 4,488,935 A | 12/1984 | Ruhe | |
| 4,495,034 A | 1/1985 | Lucas | |
| 4,566,434 A | 1/1986 | Lindenbauer | |
| 4,584,061 A | 4/1986 | Shelton | |
| 4,639,293 A | 1/1987 | Lew | |
| 5,053,110 A * | 10/1991 | Deutsch | B01D 3/02 202/176 |
| 5,628,879 A * | 5/1997 | Woodruff | C02F 1/14 202/234 |
| 2004/0025931 A1* | 2/2004 | Aguglia | F24S 10/17 136/246 |
| 2008/0073198 A1* | 3/2008 | Simon | C02F 1/14 202/81 |
| 2011/0139601 A1* | 6/2011 | Johnstone | B01D 1/0035 202/180 |
| 2012/0234771 A1* | 9/2012 | Dyson | C02F 1/14 210/748.09 |
| 2015/0353379 A1* | 12/2015 | Lee | C02F 1/14 203/10 |

* cited by examiner

Primary Examiner — Renee Robinson
(74) Attorney, Agent, or Firm — Chernoff, Vilhauer, McClung & Stenzel, LLP

(57) ABSTRACT

A low to medium output solar fluid evaporation/distillation system is described that is practical to manufacture using current photovoltaic solar panels or enhanced photovoltaic panels designed exclusively for this application. The system works in conjunction with a water feed in system that provides a minimum quality of water or other fluid to the distillation chamber. The system utilizes a warming envelope and can have optimized dielectric mirrors designed to enhance the water purity and increase output.

6 Claims, 4 Drawing Sheets

PHOTOVOLTAIC DISTILLER FOR THE RECYCLING OF GREYWATER TO POTABLE WATER

CROSS-REFERENCES TO RELATED APPLICATIONS

This application claims priority to U.S. Provisional Patent Application Ser. No. 62/606,682 filed on Oct. 5, 2017, entitled "SORA Water Recycler—Grey to Potable Water Recycler and Reuse", the disclosure of which is hereby incorporated by reference.

BACKGROUND OF THE INVENTION

The field of invention relates to water distillers, and more particularly pertains to a new and improved solar water distiller apparatus to efficiently and effectively provide potable water economically.

FIELD OF THE INVENTION

Solar photovoltaic panels are now required on all future California homes and that technology is expanding globally and cost steadily decreasing. Hybrid PVT or photovoltaic thermal panels are being tested as a new technology. These PVT panels create both thermal and electrical energy.

Potable quality water is increasingly scarce in the arid parts of the world where solar radiance is at a maximum. Reverse osmosis and other ultra-filtration techniques for potable water require large amounts of energy and require large centralized highly leveraged facilities to be effective. These processes are expensive to setup and operate.

The need for conversion of waste water to potable water is critical to solving climate change and need for clean drinking water worldwide for growing populations.

The use of water distillers and solar energy is well known in the prior art. As may be appreciated, however, these devices have lacked aspects to provide efficiency of operation and effectiveness, as particularly applied to small volume capacities as may be found in residential dwellings. For example, U.S. Pat. No. 4,488,935 to Ruhe sets forth a fluid distillation apparatus utilizing a microwave energy source and a solar energy collector which may both be used to heat a fluid for distillation.

U.S. Pat. No. 4,495,034 to Lucas sets forth a water effluent treatment apparatus including a reservoir mounted on a stand connected to a solvent migrator for receiving a constant supply of solution thereto. A second reservoir is provided including a cloth to contact fluid in the secondary reservoir while being maintained parallel to the sun's rays with automatic leveling means and apparatus for recirculating waste effluent. The solar distiller is constructed in two parts consisting of a secondary reservoir and collecting dome of glass panels and collecting troughs running to the exterior of the unit with optional mirrors to capture and collect reflective light from the collecting dome. The Lucas patent, while of interest, fails to provide the inner relationship of an evacuating solar powered pump and solar tracking organization to efficiently and effectively distill water.

U.S. Pat. No. 4,566,434 to Lindenbauer sets forth a solar tracking energy collector to focus sun's rays at a desired orientation including a lens to focus the rays of the sun upon indentation of a collector which has a liquid conducting passageway fitted therearound for absorbing heat of the sun's rays and conducted to it by the lens.

U.S. Pat. No. 4,584,061 to Shelton sets forth a desalinization apparatus including a spherical tank provided with means to introduce water to be converted to steam in a lower zone of the tank and structure to guide the steam into a condensate bowl within the same spherical tank. The Shelton patent is of interest to note the use of a spherical tank but is of an organization of complexity remote from that of the instant invention.

U.S. Pat. No. 4,639,293 to Lew sets forth a solar powered still wherein water to be distilled is supplied from a reservoir vessel sealed off after a batch loading wherein the vessel is elevated above a solar collector. Water is fed into a heater through an array of tubing through the solar collector with water directed by gravity through an orifice and heat exchanger condenser. The array of the heater tubing is routed through a solar collector is connected to another vertical tubing directed into an overflow tank. The Lew patent is of interest relative to the utilization of a solar powered device, but lacks the refinements of an evacuation pump controlled by pressure gauge to maintain a predetermined pressure within a spherical boiler to effect efficiency within a distilling apparatus.

As such, it may be appreciated that there is continuing need for a new and improved solar water distiller that effectively and efficiently distills water to a potable form.

BRIEF SUMMARY OF THE PRESENT INVENTION

The photovoltaic distillation system of the present invention can produce potable quality water from in the same mounting and footprint of traditional solar photovoltaic panels and can be mounted in similar configuration and similar locations (i.e. rooftops, ground mounts, as part of water systems)

The present approach either uses a standard photovoltaic panel with the addition of a fitted distillation box (reference new art) or with a specially designed photovoltaic panel to optimize the process.

The present approach also adds optional dielectric UV optimized mirrors for bacteria and other pathogen disruption as well as pre-heating of the feed water. The preheating of feed water optimizes the distillation and allows for optional solar thermal collection and storage in tanks collocated or separate from the system.

The approach balances the need for heat and UV disruption of pathogens as water is moved slowly thru the preheater and distilled across the back of the photovoltaic panel.

Additionally, the balance of conversion of potable water vs thermal heat can be varied seasonally, such that more potable water can be created in the summer when thermal heat is not required and the opposite in the winter when rain water capture sustains the potable supply.

Figure 1:
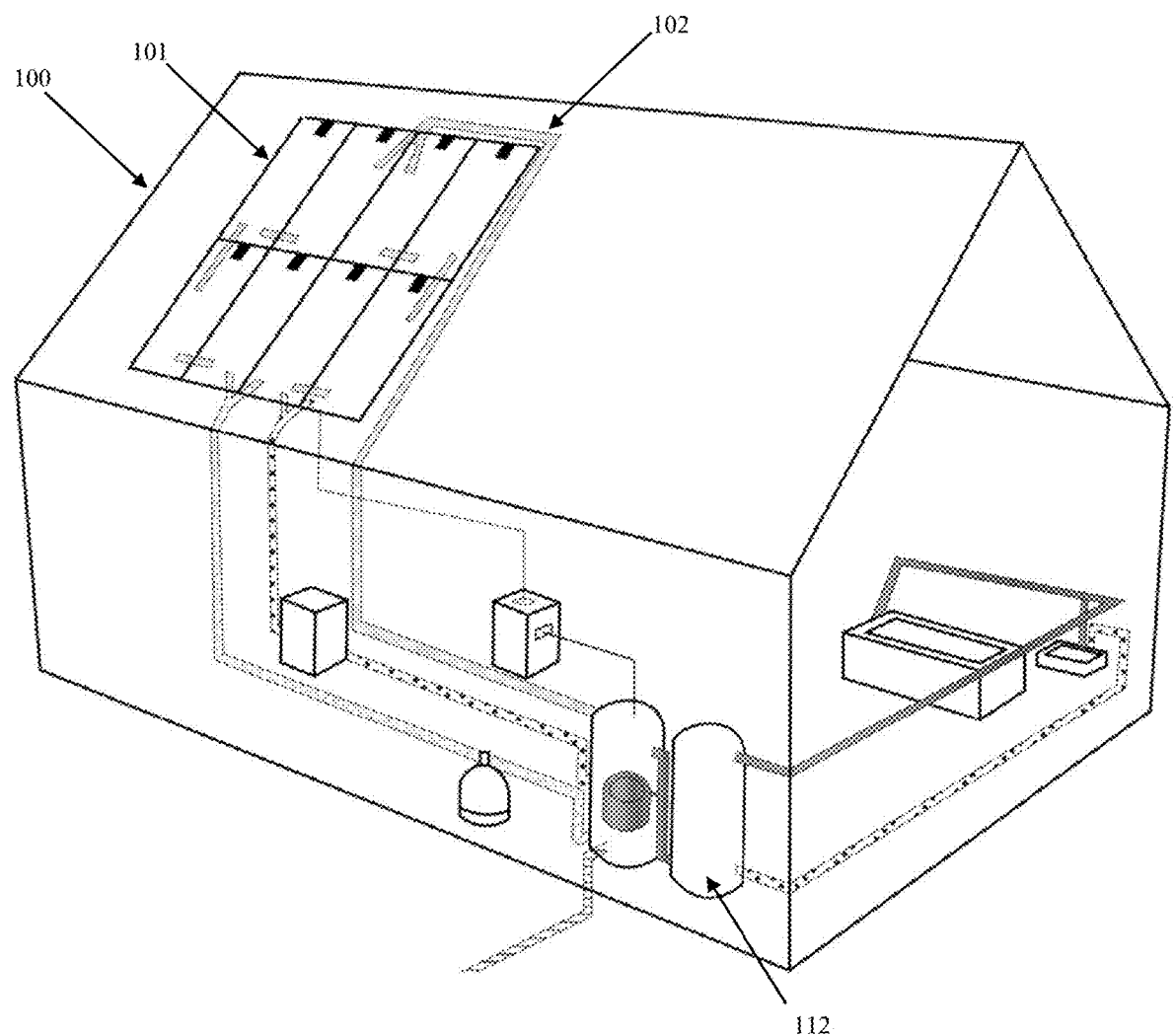
FIG. 1 is a diagram of a residence showing the placement of solar panels containing the invention as according to an embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

For purposes of this Description, the term "greywater" shall include the used water from showers, sinks, and washing machines, is relatively clean water. It may contain bacteria, dirt, detergents, grease, and hair; but it does not come into contact with feces.

Referring now to FIG. 1 there is shown a diagram of a residence showing the placement of solar panels (101) containing the invention as according to an embodiment of the present invention. The solar panels (101) can be placed on the roof of a home (100) in an orientation that captures an optimal amount of solar radiation. The exact location and angle of placement will vary based on the geographic location of the installation.

The home (100) can contain other components of a system for the conversion of greywater to potable or wash-safe water for use within the home (100). The other components perform additional steps in the recycling process such as removal of solids and other chemicals present within the greywater. In an embodiment of the present invention, a greywater feed line (102) transports greywater from a holding tank to the solar panels (101). The present invention captures solar energy to heat the greywater, cause evaporation and subsequent distillation of the greywater as described further herein. The distilled water is transported to a potable water storage tank (112) where it is held until used within the home (100). Water not distilled but filtered by other components of a greywater recycling system can be used for washing or bathing in sinks, faucets, or bathtubs located in the home (100).

The present approach also adds optional dielectric UV optimized mirrors for bacteria and other pathogen disruption as well as pre-heating of the feed water. The preheating of feed water optimizes the distillation and allows for optional solar thermal collection and storage in tanks collocated or separate from the system. It should be noted that the solar panels (101) containing the present invention can also be ground-mounted or placed in other locations that allow them to be part of a greywater recycling system.

Figure 2:
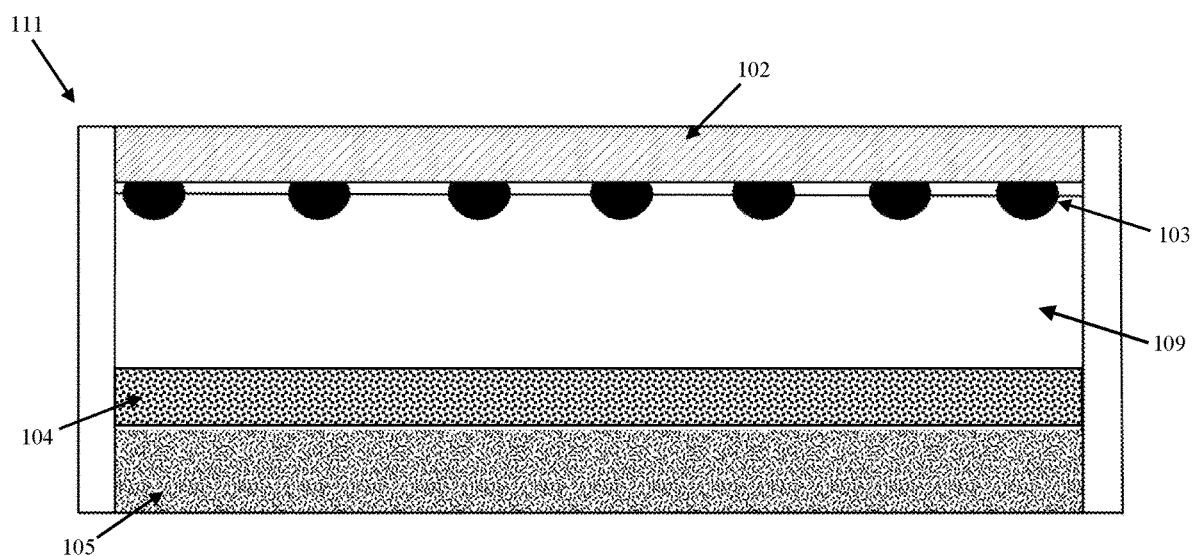
FIG. 2 is a cross section of a distillation panel as according to an embodiment of the present invention.

Referring now to FIG. 2, there is shown a cross section of a distillation panel (111) as according to an embodiment of the present invention. The distillation panel (111) can be constructed as part of a solar panel (FIG. 1, 101) and placed on the roof of a home (FIG. 1, 100). The distillation panel (111) comprises a layer of a photovoltaic panel (102) as glazing through which solar radiation initially passes. The photovoltaic panel converts at least a portion of solar energy to electricity. The electricity can be used within a home for residential purposes, or to assist in powering the recycling of greywater to usable wash water or potable water. The distillation panel (111) contains a distillation chamber (109) that captures distilled water. A plurality of dielectric mirror (102) and glass tubes (103) exists within the distillation chamber (109). The dielectric mirror is optimized for 254 nm ultraviolet light. Greywater from a home (104) is passed through the distillation panel (111) through a stainless-steel quilt or envelope that is optimized for surface area and water flow. A layer of insulation (105) is placed underneath the stainless-steel quilt to maximize heat retention and enhance evaporation of the greywater (104).

Greywater (104) is passed through the distillation panel (111) in the stainless-steel quilt and is evaporated through the quilt by heat generated from incoming solar radiation. Distilled water is trapped within the distillation chamber (109) where it is collected and stored in the home (FIG. 1, 100) for future use. Manifolds at the end of the distillation panels (111) connect the plurality of glass tubes (103). The dielectric mirror may be flat.

Figure 3:
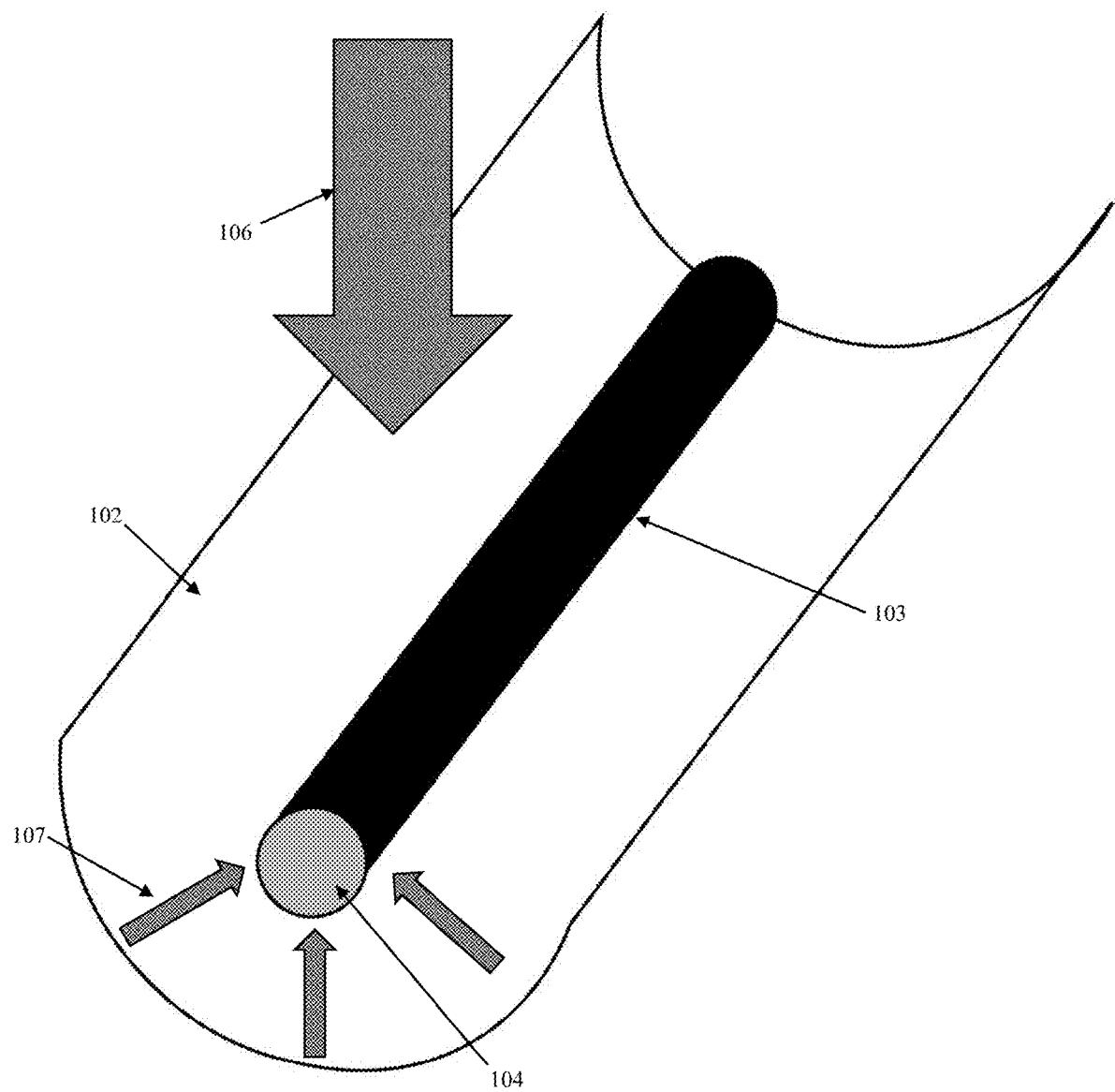
FIG. 3 is a perspective view of a parabolic concentrator embodiment as according to an embodiment of the present invention.

Referring now to FIG. 3, there is shown a perspective view of a parabolic concentrator embodiment as according to an embodiment of the present invention. In this configuration, incoming full spectrum solar radiation (106) strikes the parabolic concentrator (102) and is concentrated, then reflected back on to a greywater housing tube (103). The parabolic concentrator (102) can be a dielectric mirror that is optimized for 254 nm of ultraviolet light. In some embodiments of the present invention, the greywater housing tube (103) can be stainless-steel quilt or envelope as described above in FIG. 2. The reflected concentrated full solar spectrum energy (107) is reflected by the parabolic concentrator (102) on to the stainless-steel mesh causing the greywater (104) to evaporate and pass through the mesh as a distillate. The distilled water is captured and stored for later use in the home (FIG. 1, 101) as potable water.

Figure 4:
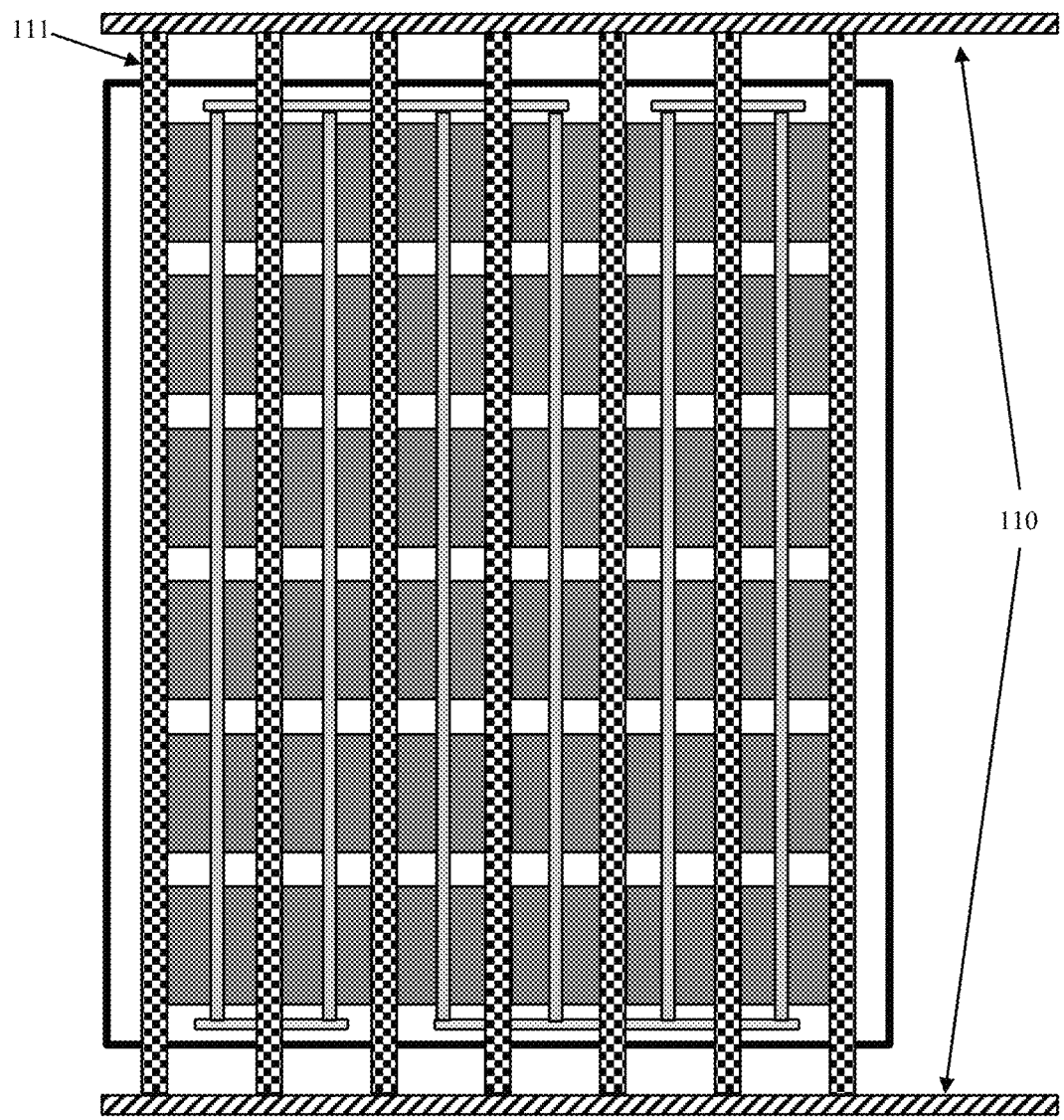
FIG. 4 is a plan view of a concentrator layout as according to an embodiment of the present invention.

Referring now to FIG. 4, there is shown a plan view of a concentrator layout as according to an embodiment of the present invention. Manifolds (110) connect the plurality of distillation panels (FIG. 2, 111) so that greywater may be passed through the distillation panels (111).

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for creating assignments in an incident command system. Further, since numerous modifications and changes will readily occur to those skilled in the art, it is not desired to limit the method for creating assignments in an incident command system to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. A photovoltaic distiller for the recycling of greywater to potable water comprising:
    a distillation chamber constructed so that distilled water is captured for later use in a home;
    a photovoltaic panel that transforms a portion of received solar energy to electrical energy;
    a dielectric mirror that is optimized to 254 nm ultraviolet light;
    a plurality of tubes;
    a stainless-steel sheet or envelope, the stainless-steel sheet also being constructed to allow for heated greywater to pass through it as pre-purified water; and
    an insulation layer;
    wherein the photovoltaic panel is located at the top of the photovoltaic distiller, the dielectric mirror positioned underneath the photovoltaic panel, the plurality of tubes being connected to the dielectric mirror, the distillation chamber being located between the dielectric mirror and stainless-steel sheet or envelope, and the insulation layer being located underneath the stainless-steel sheet or envelope.

2. The photovoltaic distiller of claim 1 wherein greywater suitable for washing or bathing is also produced.

3. The photovoltaic distiller of claim 1 wherein the dielectric mirror is flat.

4. The photovoltaic distiller of claim 1 wherein the photovoltaic distiller is constructed to be placed in a solar panel.

5. The photovoltaic distiller of claim 1 further comprising a water storage tank where distilled water collected from the photovoltaic distiller is stored.

6. The photovoltaic distiller of claim 1 wherein the greywater is water from showers, sinks, or washing machines of a home.

* * * * *

UNITED STATES PATENT AND TRADEMARK OFFICE
CERTIFICATE OF CORRECTION

| | |
|---|---|
| PATENT NO. | : 11,285,398 B2 |
| APPLICATION NO. | : 16/153665 |
| DATED | : March 29, 2022 |
| INVENTOR(S) | : Tod DuBois |

It is certified that error appears in the above-identified patent and that said Letters Patent is hereby corrected as shown below:

In the Specification

Column 5, Line 28: Delete the second occurrence of "apparatus".

Signed and Sealed this
Twenty-second Day of August, 2023

Katherine Kelly Vidal
*Director of the United States Patent and Trademark Office*